United States Patent [19]

Friesen et al.

[11] Patent Number: 5,681,433
[45] Date of Patent: Oct. 28, 1997

[54] MEMBRANE DEHYDRATION OF VAPOROUS FEEDS BY COUNTERCURRENT CONDENSABLE SWEEP

[75] Inventors: Dwayne T. Friesen; David D. Newbold; Scott B. McCray; Roderick J. Ray, all of Bend, Oreg.

[73] Assignee: Bend Research, Inc., Bend, Oreg.

[21] Appl. No.: 307,355

[22] Filed: Sep. 14, 1994

[51] Int. Cl.[6] .................... B01D 3/00; B01D 19/00; B01D 53/22
[52] U.S. Cl. .................... 203/39; 95/52; 95/255; 159/DIG. 27; 203/49; 203/98; 203/DIG. 16; 210/640
[58] Field of Search ............... 203/39, 98, DIG. 16, 203/14, 49; 159/DIG. 27, DIG. 28; 96/6; 95/52, 43, 254, 255; 210/640

[56] References Cited

U.S. PATENT DOCUMENTS

| | | | |
|---|---|---|---|
| 2,947,687 | 8/1960 | Lee | 210/640 |
| 4,466,202 | 8/1984 | Merten | 203/26 |
| 4,553,983 | 11/1985 | Baker | 55/16 |
| 4,718,921 | 1/1988 | Makino et al. | 55/16 |
| 4,931,070 | 6/1990 | Prasad | 96/9 |
| 5,034,025 | 7/1991 | Overmann, III | 95/52 |
| 5,096,584 | 3/1992 | Reddy et al. | 210/321.83 |
| 5,108,464 | 4/1992 | Friesen et al. | 96/8 |
| 5,236,474 | 8/1993 | Schofield et al. | 95/47 |
| 5,383,957 | 1/1995 | Barbe et al. | 96/8 |

*Primary Examiner*—Virginia Manoharan
*Attorney, Agent, or Firm*—Chernoff, Vilhauer, McClung & Stenzel

[57] ABSTRACT

A process for the dehydration of a vaporous mixture. The basic process involves directing a predominantly condensable water vapor-containing vaporous mixture against the feed side of a membrane while maintaining the feed near saturation without condensing it, directing a condensable vapor sweep stream past the permeate side of the membrane in a countercurrent flow, thereby transporting water vapor in the vaporous mixture from the feed side to the permeate side of the membrane to form a noncondensed combined permeate side mixture of condensable vapor and transported water vapor.

1 Claim, 7 Drawing Sheets

MEMBRANE DEHYDRATION OF VAPOROUS FEEDS BY COUNTERCURRENT CONDENSABLE SWEEP

BACKGROUND OF THE INVENTION

Vapor permeation is a membrane-based process that can be used to dehydrate mixtures of vapors. In an example of such a process, a vaporous mixture of ethanol containing low concentrations of water is fed at essentially ambient pressure to the feed side of a membrane, while a vacuum pump or a gaseous sweep stream maintains a sufficiently low partial pressure of water on the permeate side of the membrane to provide a chemical potential gradient of water across the membrane. The water and some of the ethanol are transported to the permeate side of the membrane to form a vapor-phase permeate.

One problem commonly associated with vapor permeation is economically providing and maintaining the chemical potential gradient across the membrane. Those permeation processes employing a vacuum pump or condenser to provide the necessary chemical potential gradient are energy-intensive and thus expensive to operate. As the vapor feed stream passes along the length of the membrane, the concentration (and therefore the vapor pressure) of the vaporous component desired to be removed from the vaporous feed stream is reduced to low levels. Thus, to maintain a driving force for transport, the partial pressure of that component in the permeate stream must be kept even lower for permeation and therefore separation to take place. If a vacuum pump is used to maintain the difference in partial pressure of the permeated component in the vapor phase feed stream and the partial pressure of the component in the vapor phase permeate, the pump must maintain a very high vacuum, i.e., a very low absolute pressure, thus incurring high capital and operating costs. Similarly, if a condenser is used, extremely low temperatures must be maintained, requiring a costly and complicated refrigeration system.

U.S. Pat. No. 4,978,430 discloses a vapor permeation process for dehydrating and concentrating an aqueous solution containing an organic compound, whereby the permeate is kept under reduced pressure or a "dry inert gas" can be used to reduce the partial pressure. However, there is no recognition of the value of using a condensable countercurrent sweep in a vapor permeation process.

U.S. Pat. No. 5,226,932 discloses a membrane process for drying noncondensable gases such as air, nitrogen, carbon dioxide or ammonia that uses low vacuum levels and a dry countercurrent sweep gas on the permeate side of the membrane. Commonly-owned U.S. Pat. No. 5,108,464 also discloses a membrane process for drying noncondensable gases such as air, lower hydrocarbons and acid gases using a countercurrent sweep gas, wherein the sweep gas may be introduced to the permeate side of a hollow fiber membrane module at the retentate end, such that it mixes with the permeate as it passes along the membrane and then exits at the feed end of the module. However, neither patent suggests the use of a condensable vapor sweep or the dehydration of a predominantly condensable vapor feed.

U.S. Pat. No. 5,034,025 discloses a membrane process for drying water vapor-containing noncondensable gases such as air, carbon dioxide or natural gas that includes maintaining a water vapor partial pressure differential across the membrane, contacting the lower pressure and permeate side of the membrane with a dry organic condensable sweep gas that is immiscible with water, preferably in a countercurrent flow mode, collecting and condensing the sweep gas containing permeated water, thereby forming a two-phase organic-aqueous liquid condensate, then separating the organic and aqueous phases. However, there is no recognition of the value of using a condensable vapor sweep for removing water vapor from a predominantly condensable vapor feed.

Thus, although the prior art has utilized a condensable countercurrent sweep in a permeation process for the removal of water vapor from a mixture of noncondensable gases, there has been no recognition of the value of using a condensable countercurrent sweep in a process for the dehydration of a feed containing a mixture of several vapors, the mixture being predominantly condensable.

SUMMARY OF THE INVENTION

In its broadest aspect, the present invention comprises a process for the removal of water vapor from a vaporous mixture, comprising directing a vaporous mixture against the feed side of a membrane, directing a condensable vapor sweep stream past the permeate side of the membrane in a manner such that the flow of the condensable vapor sweep is substantially countercurrent to the flow of the vaporous mixture feed, thereby transporting at least a portion of the water vapor in the vaporous mixture from the feed side to the permeate side of the membrane to form a combined permeate side mixture of condensable vapor and the transported water, and collecting the combined permeate side mixture. The transported water can then be recovered by separating the same from the combined permeate side mixture.

Dehydration performed in accordance with the present invention results in significantly higher permeate fluxes due to increased driving force, while maintaining the same or greater separation factor, and assists in maintaining the temperature of the feed stream sufficiently high. In addition, the use of a condensable vapor sweep stream allows the driving force for transport to be maintained without the need for high vacuum.

DETAILED DESCRIPTION

Figure 1:
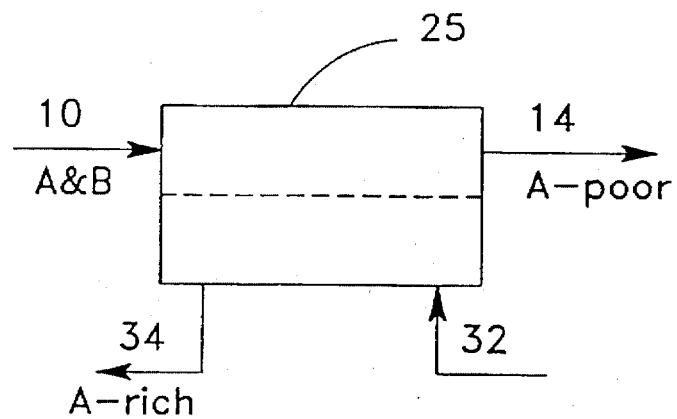
FIGS. 1-13 are schematic diagrams of exemplary systems for conducting the countercurrent condensable sweep dehydration process of the present invention.

Referring now to the drawings, wherein like elements are designated by the same numerals, FIG. 1 depicts a system wherein a feed stream 10 containing at least two vaporous components A and B is fed to a membrane module 25. Component A is water vapor and component B is a non-water vapor, such as an organic vapor like methanol, ethanol or benzene. A condensable vapor sweep stream 32 is fed to the permeate side of the membrane module 25 at a vapor inlet port located near the retentate end of the module so as to flow countercurrent to the feed stream. Water vapor is selectively removed from the feed stream in the membrane module, producing a retentate stream 14 depleted in water vapor ("A-poor"). Condensable vapor sweep stream 32 mixes with the vaporous permeate enriched in water vapor as it permeates the membrane of module 25, producing a combined permeate side mixture 34 which exits from the module at a vapor outlet port located near the feed end of the module.

Figure 2:
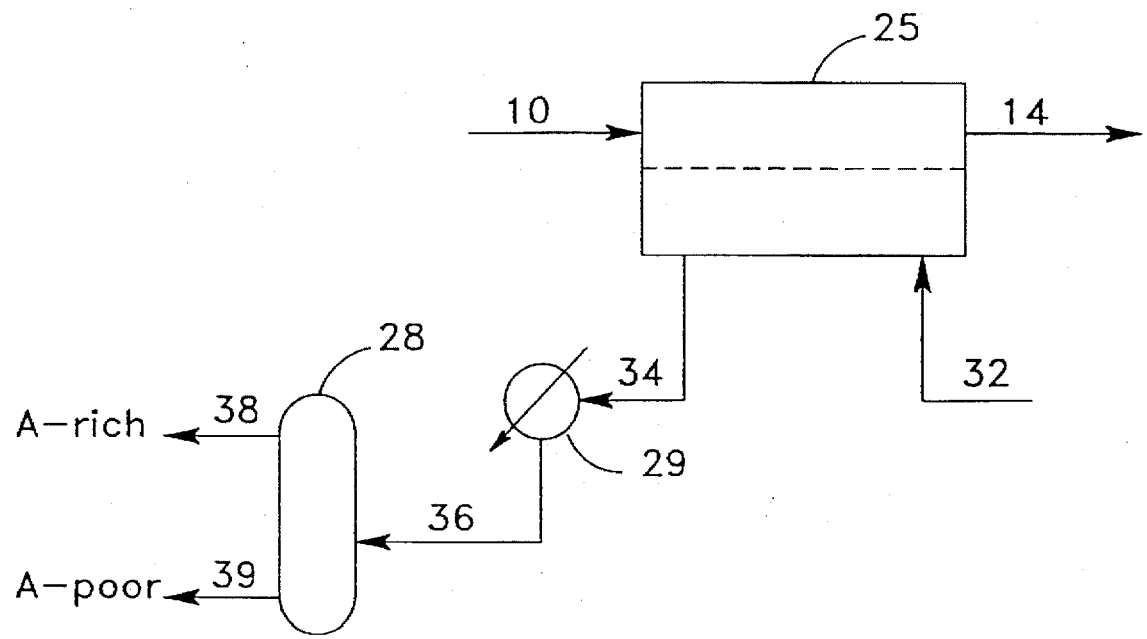

FIG. 2 depicts a system wherein a feed stream 10 containing water vapor and at least one nonwater vapor component is fed to a membrane module 25. A condensable vapor sweep stream 32 is fed to the permeate side of the membrane module 25 at a vapor inlet port located near the retentate end of the module so as to flow countercurrent to the feed stream. Water vapor is selectively removed from the feed stream in the membrane module, producing a retentate stream 14 depleted in component A. Condensable vapor sweep stream 32 mixes with the vaporous permeate enriched in water vapor as it permeates the membrane of module 25, producing a combined permeate side mixture 34 which exits from the membrane module at a vapor outlet port located near the feed end of the module. Combined permeate side mixture 34 then enters a condenser 29, where the combined permeate side mixture is condensed to form condensed permeate 36. Condensed permeate 36 is directed to a separation apparatus 28, producing a stream 38 enriched in water vapor, and a stream 39 depleted in water vapor.

Figure 3:
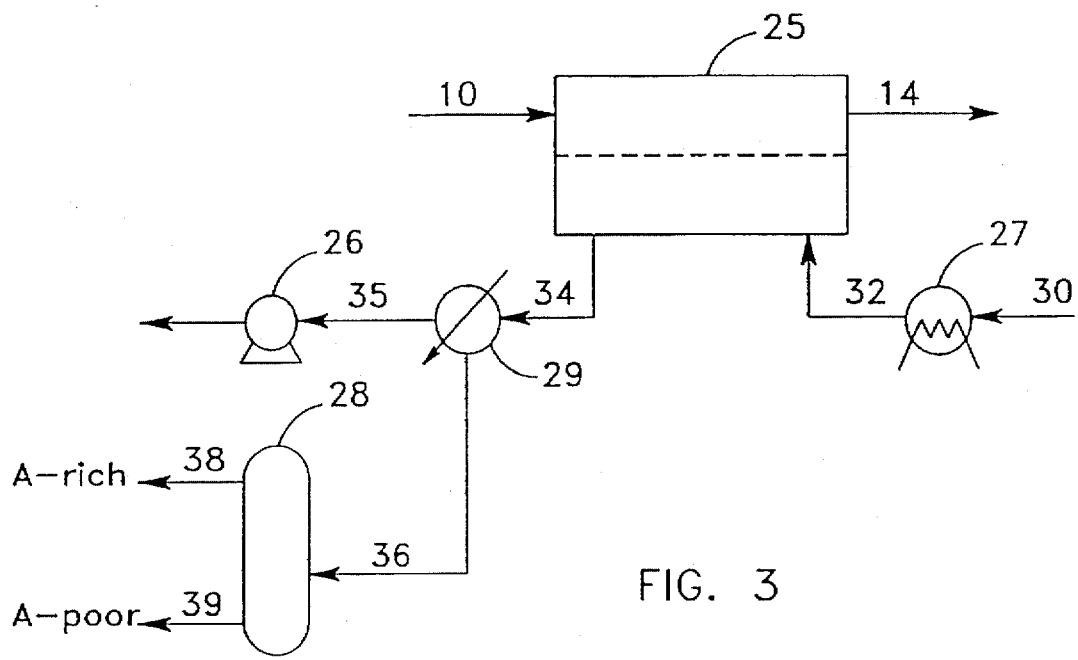

FIG. 3 is a schematic of a system that is essentially the same as the system depicted in FIG. 2, except that the condensable vapor sweep stream 32 is produced from a liquid stream 30 using a vapor generator 27. Additionally, FIG. 3 shows a stream of noncondensable components 35, which may have entered the system, exiting condenser 29. These noncondensable components are then removed using vacuum pump 26.

Figure 4:
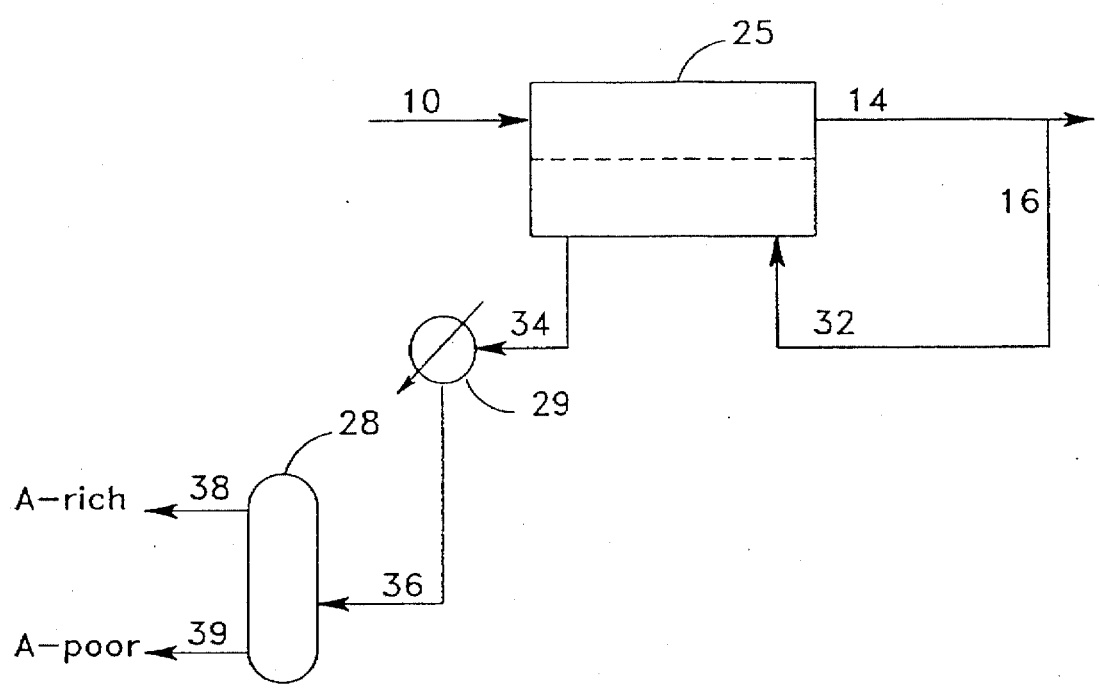

FIG. 4 is a schematic of a system that is also essentially the same as the system depicted in FIG. 2 except that a portion 16 of the depleted retentate stream 14 is used for the condensable vapor sweep stream 32.

Figure 5:
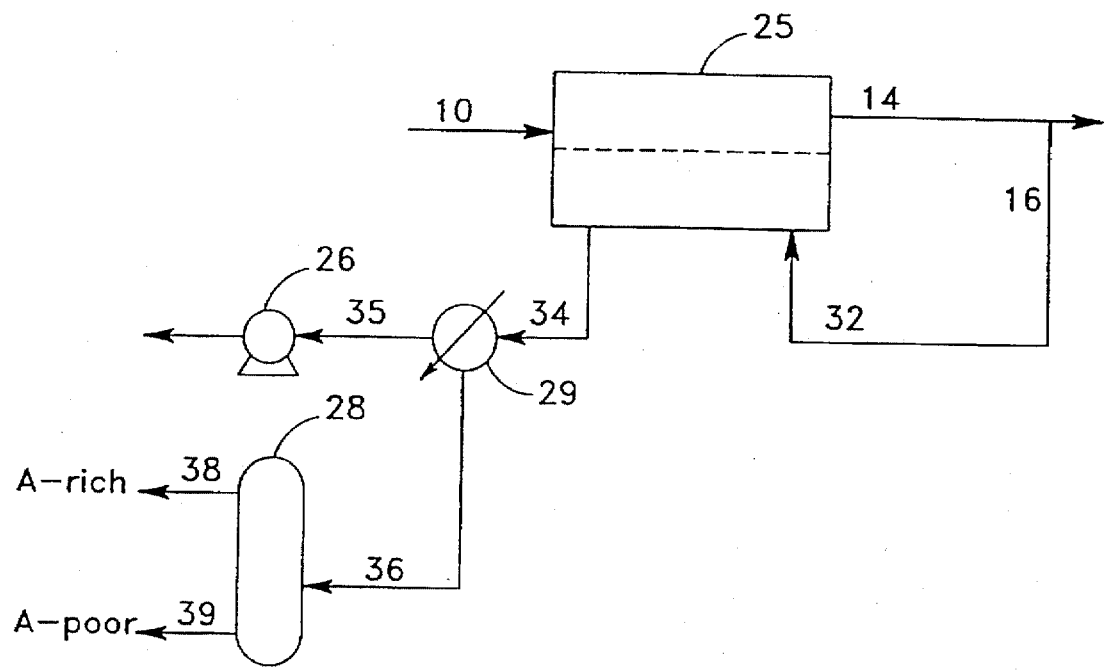

FIG. 5 is a schematic of a system that is essentially the same as the system depicted in FIG. 3 except that a portion 16 of the depleted retentate stream 14 is used for the condensable vapor sweep stream 32.

Figure 6:
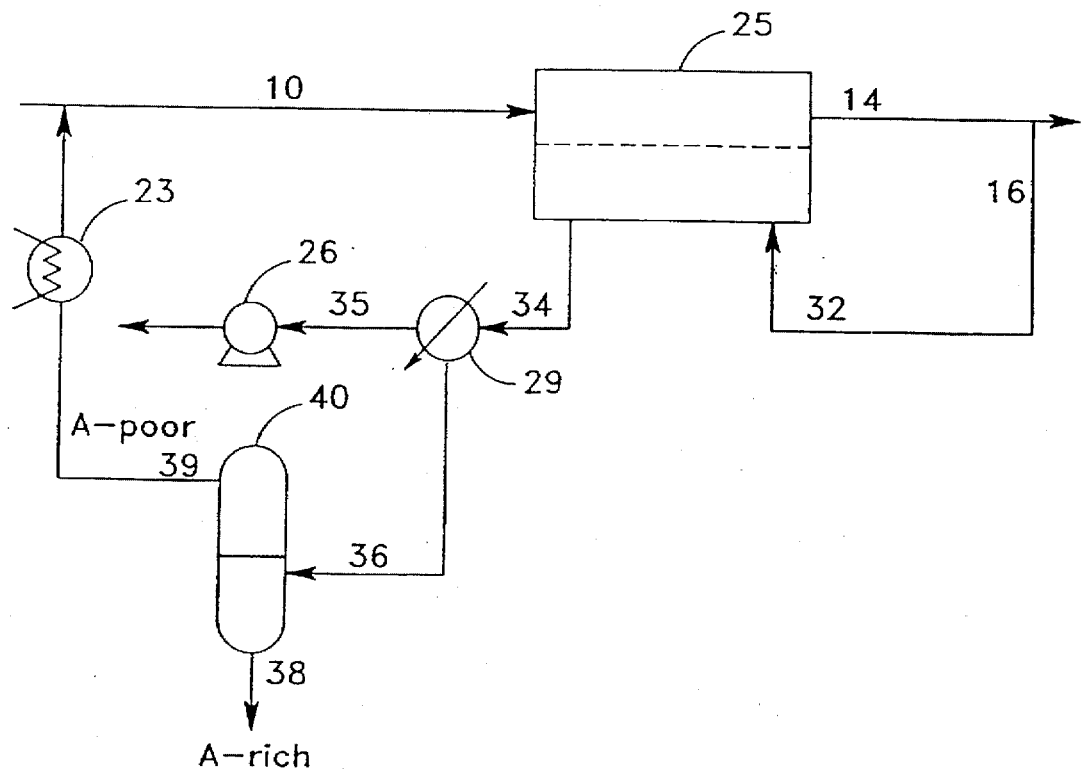

FIG. 6 depicts a system similar to the system depicted in FIG. 5 except that a decantation/phase separation apparatus 40 is specified as the separation apparatus. This embodiment is useful when water is substantially immiscible with the compound used to form the condensable vapor sweep stream. Water (component A) 38 is withdrawn from the decantation process, while the stream 39 depleted in water is vaporized in vapor generator 23 and recycled to the feed stream 10.

Figure 7:
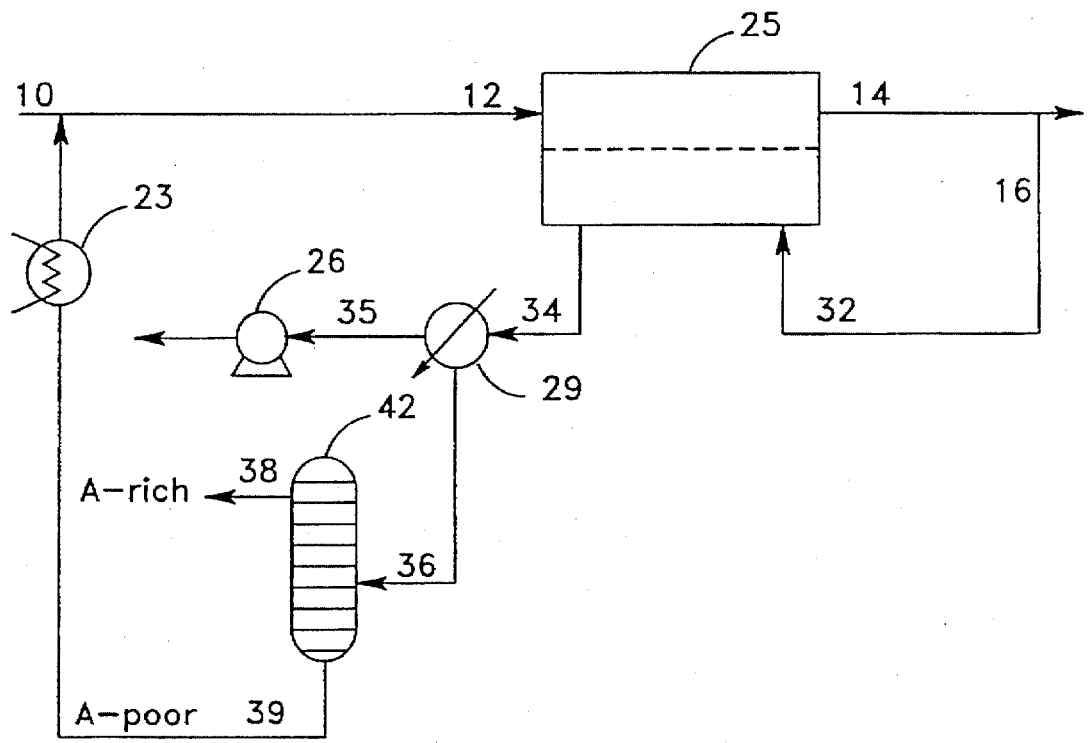

FIG. 7 shows a system similar to the system depicted in FIG. 5 except that a distillation/evaporation apparatus 42 is specified as the separation apparatus. This embodiment is useful when water is substantially miscible with the liquid used to form the condensable vapor sweep stream. Water (component A) 38 is removed from the distillation process, while the stream 39 depleted in water is vaporized in vapor generator 23 and recycled to the feed stream.

Figure 8:
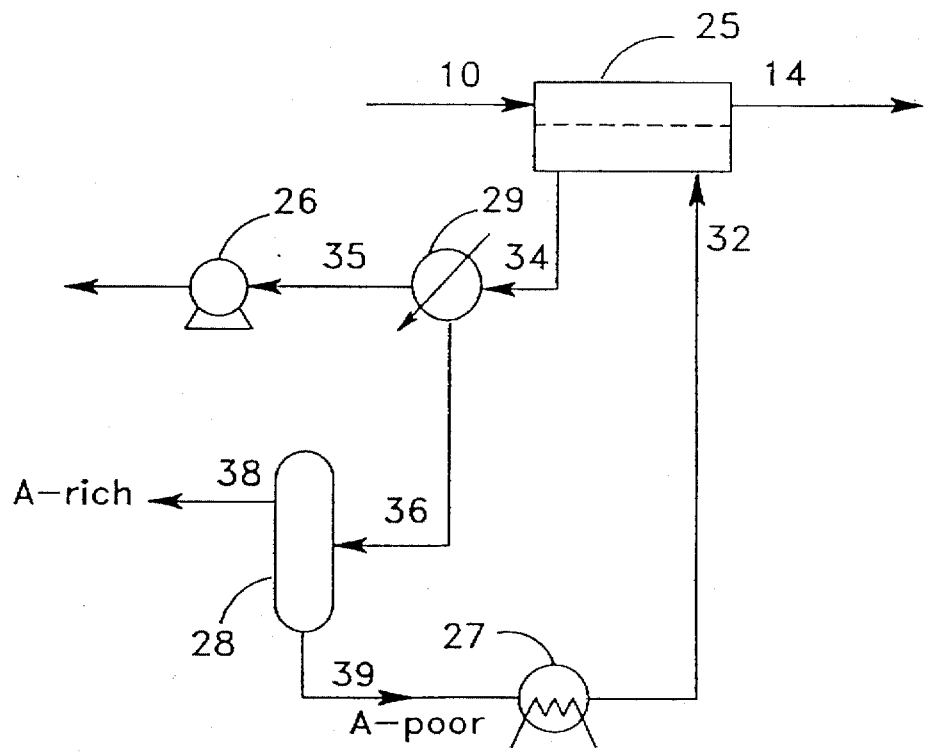

FIG. 8 depicts essentially the same system as shown in FIG. 3 except that stream 39 depleted in water from separation apparatus 28 is directed to a vapor generator 27 to produce condensable vapor sweep stream 32.

Figure 9:
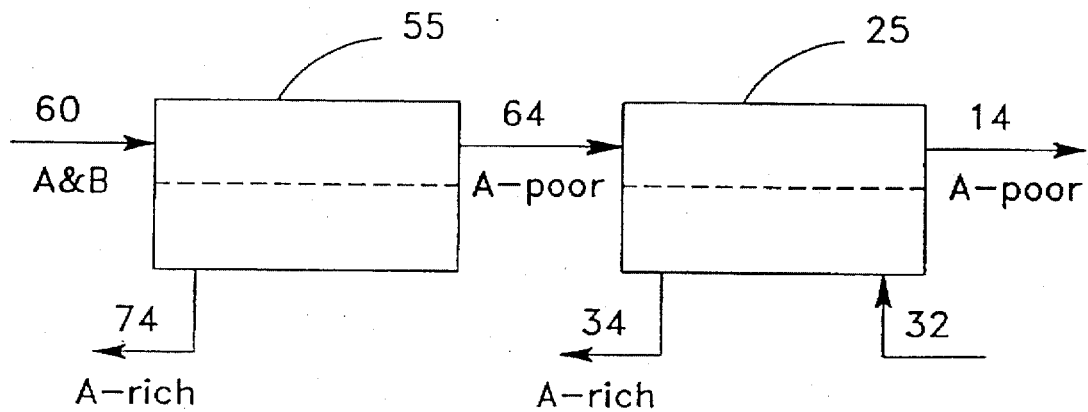

FIG. 9 depicts a system wherein a feed stream 60 containing water vapor (component A) and at least one non-water component (component B) is first fed to a conventional vapor permeation membrane module 55. Water vapor is selectively removed in the module 55, producing a retentate stream 64 partially depleted in water and a vaporous permeate stream 74 enriched in water. The partially depleted retentate stream 64 is fed to a countercurrent condensable sweep membrane module 25 of the present invention. A condensable vapor sweep stream 32 is fed to the permeate side of module 25 at a vapor inlet port located near the retentate end of the module so as to flow countercurrent to the feed stream. Water is selectively removed in module 25, producing a retentate stream 14 depleted in water vapor. Condensable vapor sweep stream 32 mixes with the vaporous permeate enriched in water vapor as it permeates the membrane of module 25, producing a combined permeate side mixture 34 which exits from module 25 at a vapor outlet port located near its feed end.

Figure 10:
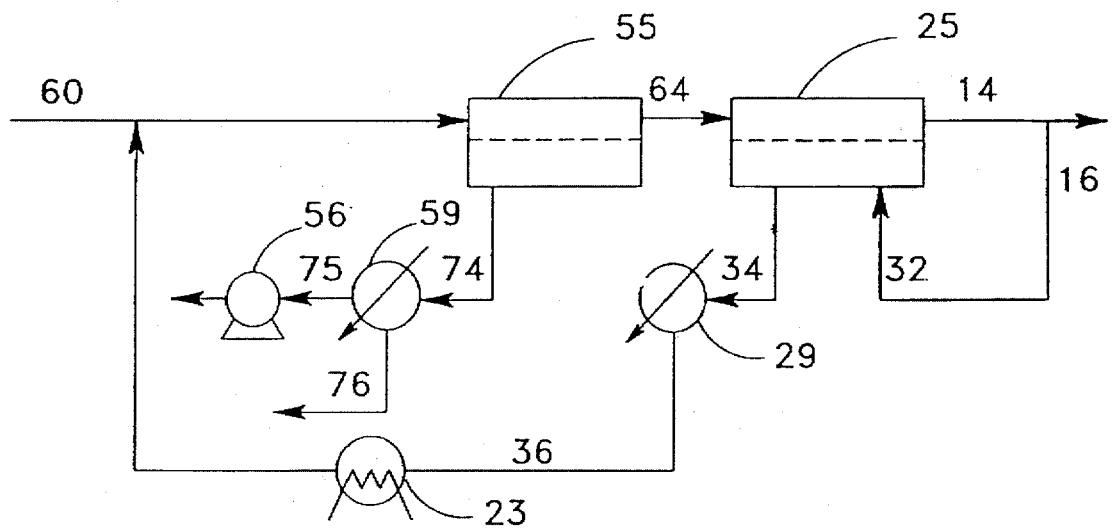

FIG. 10 is a schematic of a system that is essentially the same as that depicted in FIG. 9 except that the condensable vapor sweep stream 32 is produced from a portion 16 of the depleted retentate stream 14. Additionally, FIG. 10 shows the combined permeate side mixture 34 entering a condenser 29, where the combined permeate side mixture is condensed to form condensed permeate 36. The condensed permeate 36 is then vaporized in vapor generator 23 and recycled to the feed to the conventional vapor permeation module 55. FIG. 10 also shows the vaporous permeate stream 74 from the conventional vapor permeation module 55 entering a condenser 59, producing a condensed permeate 76. FIG. 10 also includes a stream of noncondensable components 75, which may have entered the system, exiting condenser 59. These noncondensable components are then removed using a vacuum pump 56.

Figure 11:
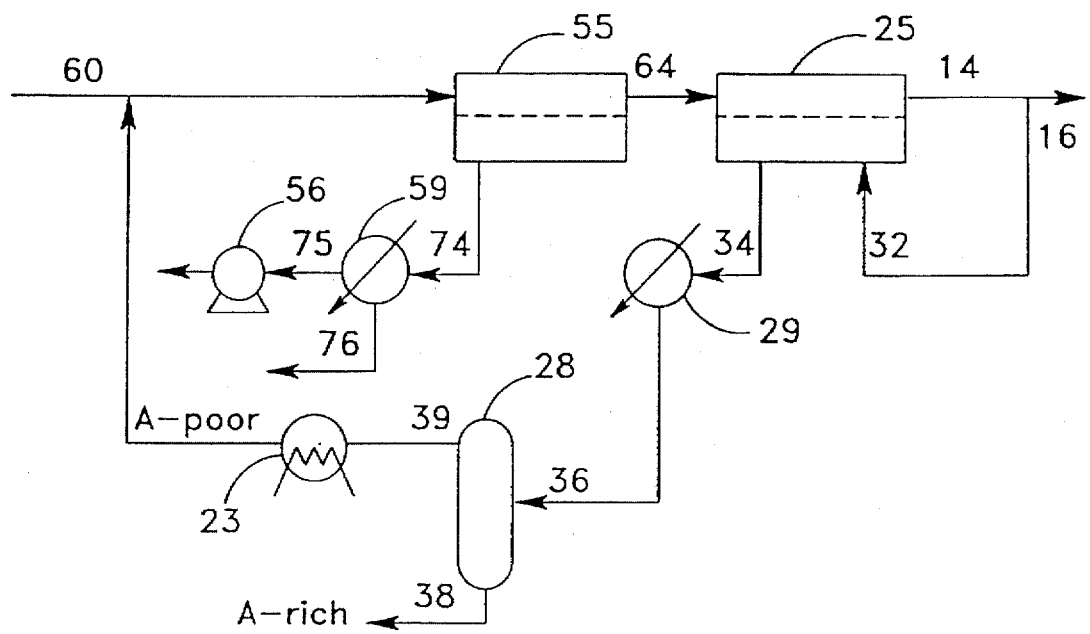

FIG. 11 is a schematic of a system that is essentially the same as that depicted in FIG. 10 except that the condensed permeate 36 is directed to a separation apparatus 28, producing a stream 38 enriched in water, and a stream 39 depleted in water, stream 39 then being vaporized and recycled to the feed to the conventional vapor permeation module 55.

Figure 12:
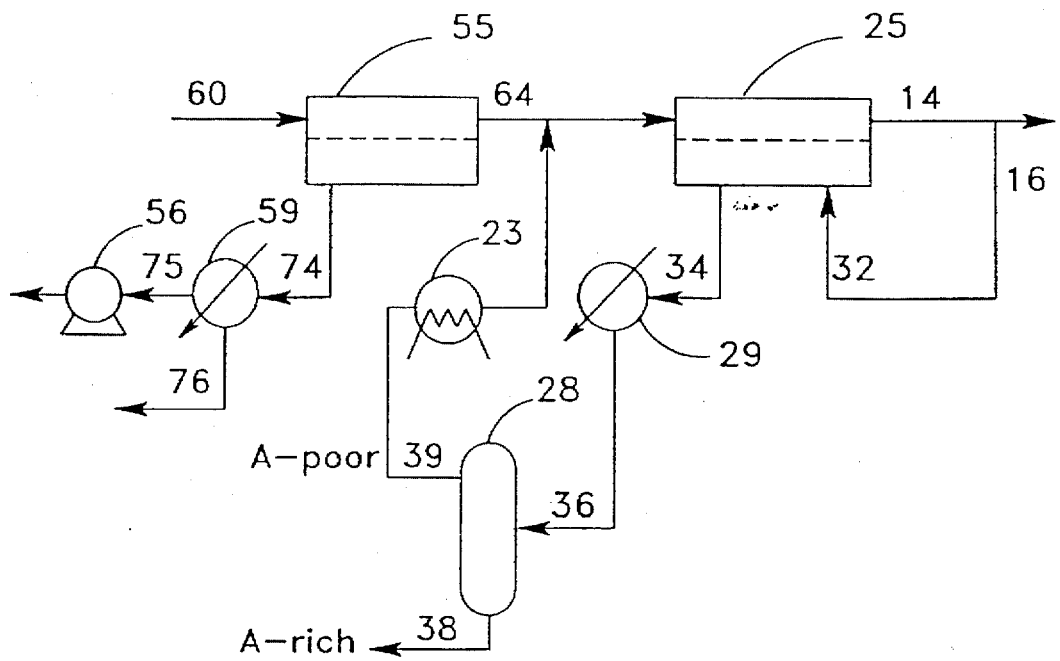

FIG. 12 is a schematic of a system that is essentially the same as the system depicted in FIG. 11 except that the stream 39 depleted in water is vaporized and recycled to the feed to the countercurrent condensable sweep module 25.

Figure 13:
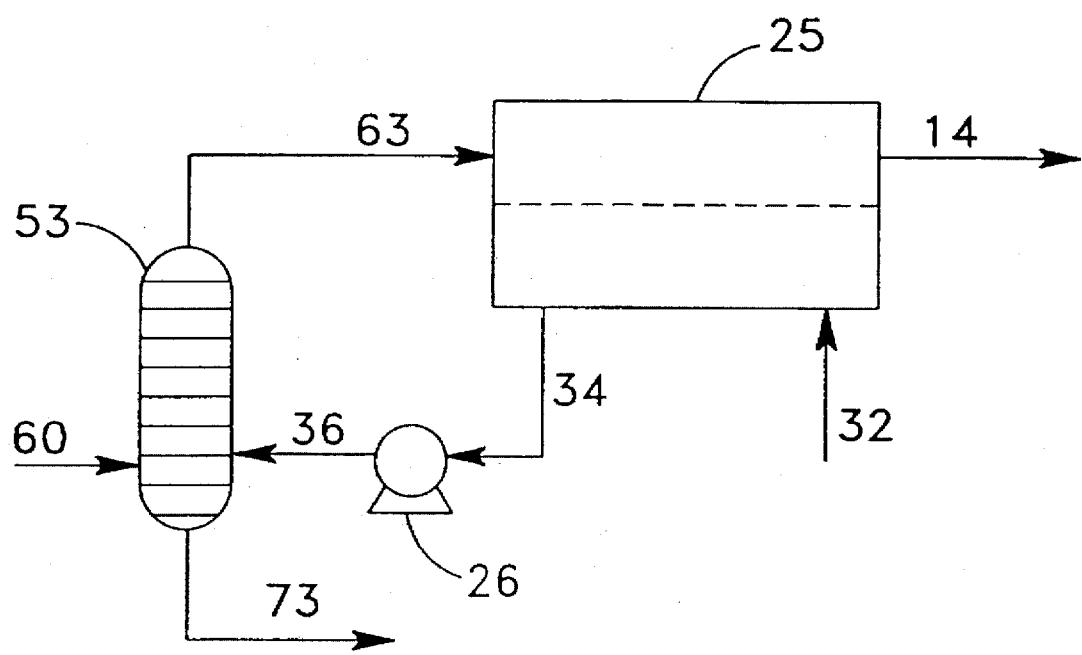

FIG. 13 depicts a system wherein a feed stream 60 containing water vapor (component A) and at least one non-water vapor component (component B) is first fed to a distillation apparatus 53. Water vapor is selectively removed by the distillation process, producing a liquid bottoms stream 73 enriched in water and a vaporous overhead stream 63 partially depleted in water vapor. The partially depleted vaporous overhead stream 63 is fed to a countercurrent condensable sweep membrane module 25 of the present invention. A condensable vapor sweep stream 32 is fed to the permeate side of module 25 at a vapor inlet port located near the retentate end of the module so as to flow countercurrent to the feed stream. Water vapor is selectively removed in module 25, producing a retentate stream 14 depleted in water vapor. Condensable vapor sweep stream 32 mixes with the vaporous permeate enriched in water vapor as it permeates the membrane of module 25, producing a combined permeate side mixture 34 which exits from module 25 at a vapor outlet port located near its feed end. The combined permeate side mixture 34 enters a pump 26 which increases the pressure of the mixture to that of the distillation column, producing stream 36. Stream 36 is then recycled to the distillation apparatus 53.

The vaporous mixture comprising the feed stream to the membrane selected for the vapor permeation process may derive from a variety of sources including, but not limited to, industrial process vent streams, the vaporous overhead from a distillation process, the overhead from a reflux process, vaporized liquids from industrial processes, vaporized industrial process vent streams, chemical process liquids, the production of fine chemicals, the production of pharmaceuticals, the recovery or purification of flavors and fragrances from natural products, or fermentation processes.

For the removal of water from organics and inorganics, the non-water vapor component may be virtually any compound so long as it has a boiling point greater than 20° C. Examples include chlorofluorocarbons such as Freons and Halons; chlorinated hydrocarbons, such as methylene chloride, trichloroethylene, trichloroethanes, carbon tetrachloride, and chlorobenzene; nonchlorinated hydrophobic organics, such as benzene, toluene, xylene, ethyl benzene, cyclohexane, hexane, octane and petroleum distillates; nonchlorinated hydrophilic organics, such as methanol, ethanol, other alcohols, acetone, ethyl acetate, methyl ethyl ketone, methyl t-butyl ketone, other ketones, nitrobenzene, phenols, cresols, formic acid, acetic acid, other organic acids; nitrogen compounds, including amines, triethylamine, pyridine, acetonitrile, dimethyl formamide, dimethylacetamide, and N-methylpyrrolidinone; and volatile inorganic compounds such as bromine, iodine, hydrazine and hydrogen cyanide.

The membrane used in the dehydration process of the present invention can be virtually any material that is more permeable to water vapor than to at least one other component of the feed stream. For removing water from organics and inorganics, the selective membrane is usually very hydrophilic. Examples of materials useful for removing water from organics include polyvinyl alcohol, cellulosic materials, chitin and derivatives thereof, polyurethanes, polyamides, polyamines, poly(acrylic acids), poly(acrylates), poly(vinyl acetates), and polyethers. Other polymers normally viewed as not especially hydrophilic (e.g., polyolefins, polystyrene and polyacrylates) can be rendered sufficiently hydrophilic to be useful as membrane materials by incorporating hydrophilic groups such as hydroxyl, amine, carboxyl, ether, sulfonate, phosphonate, quaternary amine, and ester functionalities. Such groups can be incorporated by choosing monomers that contain such groups or by adding them in a post-treatment step such as radiation- or plasma-grafting. Blends, copolymers and cross-linked versions of these materials are also useful. Crosslinking of polymers is preferred in most cases to provide sufficient resistance to swelling or dissolution by components of the feed stream.

The membrane may be isotropic or asymmetric. Additionally, the membrane may be homogeneous or a multilayer composite. In most cases, it is preferred that the membrane material be crosslinked to provide sufficient resistance to the chemicals in the feed stream. The membrane may be made by a solvent phase-inversion process, thermally induced phase-inversion process, melt-extrusion process, or by a wet or dry solvent-casting process. In the case of multilayer composites, the selective layer can be formed by dip-coating, painting, spray-coating, solution-coating, or by interfacial polymerization.

In multilayer composites, the support layers that provide mechanical strength to the composite (as opposed to the selective layer) should give as little resistance to the transport of the permeating species through the selective layer as is technically feasible. Additionally, the support membrane should be chemically and thermally resistant, allowing for operation on hot feed streams containing various chemical constituents. Materials suitable for the support membrane include, but are not limited to, organic polymers such as polypropylene, polyacrylonitrile, poly(vinylidenefluorides), poly(etherimides), polyimides, polysulfones, poly(ethersulfones), poly(arylsulfones), poly(phenylquinoxalines), polybenzimidazoles, and copolymers and blends of these materials; and inorganic materials such as porous glass, ceramics, and metals.

The membrane can be used in the form of a flat sheet or hollow fiber or tube. For flat-sheet membranes, the membrane may be placed into a module designed to permit countercurrent flow of the permeate stream relative to the feed stream. This can include plate-and-frame modules or spiral-wound modules. For hollow fibers and tubes, the feed flow may be on the outside (shell side) or inside (tube side) of the fibers. Especially preferred is a tube-side-feed hollow fiber module. The materials used in the membrane module should have sufficient chemical and thermal resistance to permit long-term operation.

In most applications, it is desirable to keep the vaporous feed stream as close to saturation as possible without condensing the feed. This is because the chemical potential of the species to be transported across the membrane is higher at saturation, leading to higher driving forces and correspondingly higher fluxes. Generally, it is desirable to operate such that the dry-bulb temperature of the feed stream is no more than 10° C. above the dew-point temperature of the feed stream, and more preferably no more than 5° C. above the dew-point temperature.

The dehydration process of the present invention is particularly useful for drying applications where the partial pressure of water vapor present in the vaporous feed stream prior to exiting the module (i.e., at the retentate end of the module) is less than about 0.1 atm. This is because as the water vapor is removed from the feed stream, its partial pressure decreases, reducing the driving force for transport across the membrane. By using a countercurrent condensable sweep stream according to the process of the present invention, the driving force for transport is maintained without any need to reduce the total pressure of the permeate stream to a value less than the partial pressure of the water vapor present in the feed stream. Although the process of the present invention will be effective for treating feed streams wherein the partial pressure of the water vapor is greater than 0.1 atm, the advantages over conventional vapor permeation processes are not as great due to the higher driving force present with the higher partial pressure.

Virtually any condensable vapor may be used as a countercurrent sweep stream. By condensable vapor is meant any compound with a boiling point greater than about −100° C. The condensable vapor may consist of one of the components of the vaporous feed solution or it may be a compound that is not present in the feed solution. The only restriction on composition is that the condensable vapor not be predominantly water. Specifically, the water content must be low enough that its partial pressure is significantly less than that of the water vapor in the retentate. Preferably, the water content of the condensable vapor is less than or equal to that of the feed stream. The condensable vapor may be either miscible or substantially immiscible with water.

In one embodiment of the process of the present invention, the condensable vapor may be one of the non-water vapor components of the feed stream. In this case, a portion of the retentate stream may be used to generate the condensable vapor used as the countercurrent sweep stream.

The volumetric flow of the condensable vapor at the vapor inlet port may be adjusted to provide the desired efficiency. Preferably, the volumetric flow of the condensable vapor is sufficient to reduce the partial pressure of water vapor on the permeate side of the membrane at the retentate end of the module below about one-half or less of the value on the feed side at the retentate end.

The permeate-side mixture may be collected and directed to a separation apparatus as a vapor. Examples of suitable separation means include, but are not limited to, distillation, fractional condensation, adsorption, absorption, or by another vapor permeation process.

Alternatively, the permeate side mixture may be collected by freezing or condensing the mixture, after which the transported water vapor may be separated. This separation step may be performed by the most convenient method, such as by decantation, distillation, liquid/liquid extraction, evaporation, crystallization, freezing, adsorption, absorption, by extraction using a membrane contactor, or by a pervaporation process.

The process of the present invention may be used to perform the entire separation desired, or it may be combined with other processes in so-called "hybrid" systems. For example, a conventional distillation process can first be used to remove the bulk of water present in a feed stream, reducing the concentration such that the partial pressure of the water in the vapor phase overhead of the distillation process is less than about 0.1 atm. The countercurrent condensable sweep dehydration process of the present invention can then be used to reduce the concentration of water down to the desired level. The exact level to which the water is removed by the preliminary distillation process is determined by the relative convenience and cost of the two processes.

In some cases, various streams from the hybrid process may be recycled to other points within the process to improve efficiency, to improve the quality of the separation, or to reduce operating costs. For example, in the hybrid system shown in FIG. 13, the condensed permeate side mixture 36 is recycled back to the distillation process. This option is particularly attractive when the concentration of the water being removed from the feed stream in the condensed permeate-side mixture from the countercurrent condensate sweep dehydration process 36 is close to the concentration of water in the initial feed stream 60.

Many other hybrid systems can be envisioned that incorporate a countercurrent condensable sweep. One reasonably skilled in the arts of membrane systems and chemical engineering will readily appreciate that through the use of the appropriate separation process and the proper use of recycle streams, highly efficient, low-cost processes can be developed.

EXAMPLE 1

Utilizing a system of substantially the same configuration as shown in FIG. 3, a feed solution 10 comprising 16 wt. % water in methanol at a dry-bulb temperature of 77° C. and essentially ambient pressure, was fed at a rate of 0.7 g/min to the lumens of hollow fiber membranes in module 25. The module 25 comprised composite hollow fibers with inside diameters of 365 µm. The effective length of the fibers was 38 cm. The inside surfaces of the hollow fibers were coated with a selective layer of crosslinked hydrophilic polymer of polyvinyl alcohol (PVA). The module had an effective membrane area of 166 $cm^2$.

A condensable sweep stream 32 comprising 100% methanol at 75° C. and 0.1 atm was introduced to the permeate side of the membrane at a vapor inlet port located near the retentate end of the module so as to flow substantially countercurrent to the flow of the feed. The flow rate of the methanol vapor sweep was set at 0.03 g/min.

A combined permeate side mixture 34 that comprised the condensable vapor sweep stream and the water that selectively permeated the membrane (including a small amount of co-permeated methanol) was withdrawn from a vapor outlet port located near the feed end of the module. The combined permeate side mixture 34 was sent to a condenser 29 cooled with a dry ice/isopropyl alcohol (IPA) solution to a temperature of approximately −75° C. A vacuum pump 26 was used to remove any noncondensable components that may have entered the system, thus maintaining a permeate pressure of approximately 0.1 atm.

Under the operating conditions described above, the combined permeate side mixture had a water concentration of 66 wt. %, resulting in an enrichment factor (ratio of water concentration in permeate to water concentration in feed) of 4.1. The water flux through the membrane was 6 $kg/m^2$-day.

Comparative Example 1

For comparison, the system described in Example 1 was operated as a conventional vapor permeation system, that is, with a partial vacuum on the permeate side but with the countercurrent condensable sweep flow set to 0 so that no methanol was introduced as a condensable vapor sweep stream to the membrane module. In this experiment, the feed solution comprised 11 wt. % water in methanol and the permeate pressure was set at 0.01 atm.

The results of this comparative run and those of Example 1 are summarized in Table 1.

TABLE 1

| Example | Permeate Pressure (atm) | Feed Concentration | Water Flux ($kg/m^2$-day) | Enrichment Factor |
|---|---|---|---|---|
| 1 | 0.1 | 16 | 6 | 4.1 |
| Comp. Ex. 1 | 0.01 | 11 | 3 | 4.5 |

As is apparent from Table 1, when using a countercurrent condensable vapor sweep stream, the enrichment factors were comparable but the water flux was twice that obtained using the conventional system, even though the conventional system was operated with a permeate pressure that was 10 times lower than that used with the countercurrent condensable vapor sweep stream. This demonstrates that the use of a countercurrent condensable vapor sweep stream results in significantly higher water flux which corresponds to a significantly smaller membrane surface area requirement for the separation. Reduced membrane area and higher permeate pressure lead to reduced capital and operating costs.

EXAMPLE 2

A computerized mathematical model of the system of Example 1 was prepared and utilized to predict performance of the system utilizing different parameters. A vaporous feed stream containing 5 wt. % water in ethanol at 75° C. is treated. The feed pressure is set at 1.1 atm and the permeate pressure at 0.01 atm using a vacuum pump/condenser combination. A condensable sweep stream comprising a portion of the retentate stream is introduced to the permeate side of the membrane at a vapor inlet port located near the retentate end of the module so as to flow substantially countercurrent to the flow of the feed. The flow rate of the sweep stream is set at 0.1% of the feed flow rate. Under such conditions, the membrane module will exhibit a water flux of 5.02 $kg/m^2$-day.

EXAMPLE 3

The system of Example 1 is operated under the same conditions of Example 2 except that the countercurrent sweep rate is adjusted to 1% of the feed flow rate. Under such conditions, the membrane module will exhibit a water flux of 5.61 kg/m²-day, based upon the mathematical model of the system.

Comparative Example 2

For comparison, the system of Example 1 is operated under the conditions of Example 2 except that the countercurrent condensable sweep is shut off so that the system operates as a conventional vapor permeation system, that is, with a vacuum on the permeate side but with the countercurrent condensable sweep flow set to 0 so that no retentate is introduced as a countercurrent condensable vapor sweep stream to the membrane module. In this case, the water flux through the membrane module will only amount to 4.78 kg/m²-day.

TABLE 2

| Example | Sweep Rate (% of Feed Flow) | Water Flux (kg/m²-day) |
| --- | --- | --- |
| 2 | 0.1 | 5.02 |
| 3 | 1.0 | 5.61 |
| Comp. Ex. 2 | 0 | 4.78 |

As is apparent from Table 2, when using a countercurrent condensable vapor sweep stream, higher water fluxes are obtainable when performing the same separation, leading to significantly lower costs for the separation.

Comparative Example 3

A system of essentially the same configuration as that used in Example 1 is used to treat a 10,000 kg/day feed stream comprising 5 wt. % water in ethanol, with the exception that the effective membrane area is 87 m². The same conditions used in Example 2 are used except that the permeate pressure is set at 0.05 atm and the module is operated as a conventional vapor permeation module-that is, with the flow of countercurrent condensable vapor sweep set to 0. Under such conditions, the retentate produced by the module will comprise 1.8 wt. % water, representing a 64% reduction in water concentration.

EXAMPLES 4–10

The system described in Comparative Example 3 is used to treat the same feed solution, except that a portion of the retentate produced by the module is used as a countercurrent condensable vapor sweep stream. The flow rate of the countercurrent condensable vapor sweep is varied to produce retentate streams of various concentrations, as shown in Table 3. Note that by using a countercurrent condensable vapor sweep the water content of the feed stream can be reduced by as much as 90%, leading to a very high purity product. Using a conventional vapor permeation process, such high levels of removal can only be achieved with much greater membrane surface area or using a much higher vacuum.

TABLE 3

| Example | Sweep Rate (% of Feed Flow) | Retentate Concentration (wt % water) | Removal (%) |
| --- | --- | --- | --- |
| Comp. Ex. 3 | 0 | 1.80 | 64.0 |
| 4 | 0.01 | 1.79 | 64.2 |
| 5 | 0.1 | 1.70 | 66.0 |
| 6 | 1 | 1.26 | 74.8 |

TABLE 3-continued

| Example | Sweep Rate (% of Feed Flow) | Retentate Concentration (wt % water) | Removal (%) |
| --- | --- | --- | --- |
| 7 | 2 | 1.04 | 79.2 |
| 8 | 5 | 0.75 | 85.0 |
| 9 | 10 | 0.58 | 88.4 |
| 10 | 15 | 0.50 | 90.0 |

EXAMPLES 11–16

Varying the countercurrent condensable sweep rate as noted in Table 4, the system described in Comparative Example 3 is used to treat the same feed solution except that the effective membrane area is 34 m² and the permeate pressure is set at 0.1 atm. The results are shown in Table 4.

Comparative Example 4

The system and module described in Comparative Example 3 is used to treat the same feed, using the same membrane surface area and permeate pressure as used in Examples 11–16 except that the flow rate of countercurrent condensable vapor sweep is set to 0. The results are reported in Table 4. As shown in Table 4, without the use of a countercurrent condensable sweep stream, only 20% of the water in the feed vapor can be removed, while more than 50% can be removed when using a countercurrent condensable sweep.

TABLE 4

| Example | Sweep Rate (% of Feed Flow) | Retentate Concentration (wt % water) | Removal (%) |
| --- | --- | --- | --- |
| Comp. Ex. 4 | 0 | 4.0 | 20.0 |
| 11 | 1 | 3.25 | 35.0 |
| 12 | 2 | 2.95 | 41.0 |
| 13 | 5 | 2.54 | 49.2 |
| 14 | 10 | 2.26 | 54.8 |
| 15 | 15 | 2.14 | 57.2 |
| 16 | 20 | 2.06 | 58.8 |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A countercurrent sweep vapor permeation non-condensation process for the removal of water vapor from a condensable vaporous mixture feed, said vaporous mixture feed consisting essentially of water vapor and at least one non-water vapor having a boiling point of greater than 20° C. comprising the steps of:

(a) providing a membrane that has a feed side, a retentate side and a permeate side;

(b) directing said vaporous mixture feed against said feed side of said membrane while maintaining said vaporous mixture feed near saturation without condensing the same;

(c) directing a sweep stream of condensable vapor past said permeate side of said membrane in a manner such that the flow of said sweep stream is substantially countercurrent to the flow of said vaporous mixture feed, thereby transporting at least a portion of the water vapor in said vaporous mixture feed from said feed side to said permeate side of said membrane to form a combined noncondensed permeate side mixture of said condensable vapor and said water vapor and to form a retentate stream comprising non-permeating components of said vaporous mixture;

(d) removing said combined noncondensed permeate side mixture; and (e) separating said water vapor from said combined permeate side mixture by producing a stream enriched in water and a stream depleted in water, wherein said vaporous mixture feed comprises the stream from a distillation process, and wherein said combined noncondensed permeate side mixture of step (c) is condensed, then recycled to said distillation process.

* * * * *